US005563975A

United States Patent [19]
Gorian et al.

[11] Patent Number: 5,563,975
[45] Date of Patent: Oct. 8, 1996

[54] FLAME-RETARDANT CABLE TUBING BUNDLE

[75] Inventors: James D. Gorian, Hudson; Eugene D. Bonnes, Mentor, both of Ohio

[73] Assignee: Furon Company, Aurora, Ohio

[21] Appl. No.: 361,203

[22] Filed: Dec. 21, 1994

Related U.S. Application Data

[63] Continuation of Ser. No. 54,599, Apr. 28, 1993, Pat. No. 5,392,374.
[51] Int. Cl.⁶ ...................................................... G02B 6/44
[52] U.S. Cl. .......................... 385/100; 174/68.1; 385/147
[58] Field of Search ...................................... 385/100, 102, 385/114, 128, 141, 145, 147; 174/68.1, 121 A; 427/163, 167

[56] References Cited

U.S. PATENT DOCUMENTS 4,723,831 2/1988 Johnson et al. ............................ 385/11
5,062,685 11/1991 Cain et al. ................................ 385/114
5,136,683 8/1992 Aoki et al. ............................... 385/141
5,173,960 12/1992 Dickinson ........................... 385/100 X
5,189,721 2/1993 Sayegh et al. .......................... 385/114
5,204,928 4/1993 Konda et al. ....................... 385/100 X

*Primary Examiner*—Akm E. Ullah
*Attorney, Agent, or Firm*—Fay, Sharpe, Beall, Fagan, Minnich & McKee

[57] ABSTRACT

A flame-retardant optical fiber cable tubing bundle which can be vertically mounted in the shaft of a building comprised of a plurality of tubes; a first thermoplastic layer surrounding the tubes; and, a tape wrapped spirally along the longitudinal axis of the first thermoplastic layer. A second thermoplastic layer surrounds the tape. A method for complying with the UL 1666 fire test procedure for a cable tubing bundle intended for vertical installation includes the steps of liquefying a cross-sectional area of a thermoplastic layer of the cable tubing bundle; forcing the flow of the liquified thermoplastic inwardly to the center of the cable tubing bundle; and, charring the liquified thermoplastic to form a cross-sectional area of solid material in the interior of the cable tubing bundle.

14 Claims, 1 Drawing Sheet

FLAME-RETARDANT CABLE TUBING BUNDLE

This is a continuation of application Ser. No. 08/054,599 filed on Apr. 28, 1993 now U.S. Pat. No. 5,392,374.

BACKGROUND OF THE INVENTION

I. Field of the Invention

This invention pertains to the art of optical fiber cable tubing bundles and more particularly to cable tubing bundles intended for vertical installation.

II. Description of the Related Art

Presently, cable tubing bundles intended for installation in the vertical shafts of buildings must meet the standard for safety imposed by Underwriters Laboratories, Inc. for flame propagation height of electrical and optical-fiber cables installed vertically in shafts. UL 1666 describes the Underwriters Laboratories, Inc.'s standard test method for determining values of flame propagation height for electrical and optical-fiber cables installed vertically in shafts. To be acceptable, the flame propagation height for a vertically installed cable cannot equal or exceed 12 feet, 0 inches. The purpose of the test is to insure that vertically installed cables comply with ANSI/NFPA 70-1987: section 725-38(b)(2), exception to section 760-28(c)(2), section 770-6(b), section 800-3(b)(2), and section 820-15(b) of the National Electric Code.

The test apparatus consists of a test chamber; burner apparatus; and, temperature and flow measurement instrumentation. Two samples of cable construction of multiple seventeen and one half (17½) feet lengths are tested. A test flame is applied to one end of the cable construction for thirty (30) minutes. After thirty (30) minutes, the test flame is extinguished and the maximum height of continuous cable damage is measured and recorded. Damage is recorded as having occurred when the combustible material comprising the cable is softened ("melt"), partially consumed ("char"), or completely consumed ("ash").

Optical fiber cable tubing bundles designed to meet or exceed the UL 1666 standard set for determining flame propagation height of cables mounted vertically in shafts, have relied on the thermoplastic material used to off gas when heated or burned creating a smothering effect, stopping flame propagation.

BRIEF SUMMARY OF THE INVENTION

The present invention provides optical fiber cable tubing bundles with an advantage that usually is accomplished through the use of specific materials selected for their ability to reduce flame propagation and smoke generation. These materials do provide acceptable test results but are more expensive. Optical fiber cable tubing bundles using the proposed invention can provide tubing bundles that will pass UL 1666 test and not be limited to the use of more costly materials as the only approach to passing the required test.

According to one aspect of the invention, there is provided a flame-retardant optical fiber cable tubing bundle. A flame-retardant optical fiber cable tubing bundle having the features of the present invention is inclusive of a plurality of tubes; a first thermoplastic layer surrounding the tubes; and a tape wrapped spirally along the longitudinal axis of the first thermoplastic layer. The first thermoplastic layer is flame-retardant and is manufactured from a material having intumescent and charring capabilities. The tape is comprised of glass fibers. The tubes, ranging in number from two (2) to nineteen (19), are made up of a flame-retardant polyethylene compound in the preferred embodiment. The tubing bundle further comprises a second thermoplastic layer surrounding the tape.

In accordance with another aspect of the invention, there is provided an optical fiber cable tubing bundle which meets the UL 1666 standard for safety. The optical fiber cable tubing bundle, which can be installed vertically in the shafts of a building, includes a plurality of tubes; a first thermoplastic layer surrounding the tubes; and, means for forcing the flow of the first thermoplastic layer inwardly to the center of the optical fiber cable tubing bundle during implementation of the UL 1666 test procedure for flame propagation height of electrical and optical-fiber cables. The number of tubes making up the bundle is from two (2) to nineteen (19). The tubes consist of a flame-retardant polyethylene compound. The first thermoplastic layer includes a flame-retardant material having both intumescent and charring capabilities.

The means for forcing the flow inwardly is a glass fiber tape wrapped spirally along the longitudinal axis of the first thermoplastic layer. A second flame-retardant thermoplastic layer also comprises the tubing bundle. The second thermoplastic layer surrounds the means for forcing the flow inwardly.

In accordance with still another aspect of the invention, a method for insuring compliance with the UL 1666 fire test procedure for a vertically mounted cable tubing bundle is disclosed. A cross-sectional area of a solid thermoplastic layer comprising the optical fiber cable tubing bundle is liquified by means of a fire source located at one end of the vertically mounted cable tubing bundle. The flow of the liquified thermoplastic is forced inwardly to the center of the optical fiber cable tubing bundle. The liquified thermoplastic is subsequently charred to form a cross-sectional area of solid material in the interior of the optical fiber cable tubing bundle. The cross-sectional area of charred material acts as a fire stop to prevent vertical flow of additional liquified thermoplastic materials resulting from continuous application of the fire source.

The flow of the liquified thermoplastic is forced inwardly by means of a fiberglass tape wrapped spirally along the longitudinal axis of the thermoplastic layer. Charring of the liquified thermoplastic is effected by continuous application of the fire source to the end of the optical fiber cable tubing bundle.

One advantage of the present invention is that a flame-retardant optical fiber cable tubing bundle having a simple design can be manufactured.

Another advantage of the present invention is that an optical fiber cable tubing bundle meeting the requirements of the UL 1666 standard for safety can be manufactured using materials that are inexpensive.

Still a further advantage of the present invention is that a method of insuring a flame propagation height of less than twelve (12) feet for a vertically mounted optical fiber cable tubing bundle is disclosed. Thus, compliance with fire test method UL 1666 is satisfied.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments

DETAILED DESCRIPTION OF PREFERRED AND ALTERNATE EMBODIMENTS

Figure 1:
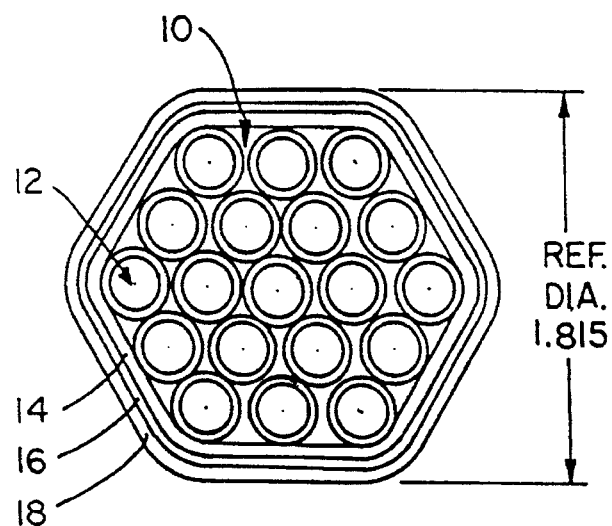
FIG. 1 is a cross-sectional view of an optical fiber cable tubing bundle of the present invention; and, FIGS. 2A–2C are cross-sectional views of the optical fiber cable tubing bundle of FIG. 1, showing the charring conditions taking place in the interior of the bundle during fire test method UL 1666.

Referring now to the drawings, wherein the showings are for purposes of illustrating preferred and alternate embodiments of the invention only and not for purposes of limiting same, as shown in FIG. 1, an optical fiber cable tubing bundle of the present invention comprises a plurality of tubes 10. The plurality of tubes 10 are surrounded by a first thermoplastic layer 14 that is a nominal thickness of 0.062 inches 14. The first thermoplastic layer 14 is surrounded by a fiberglass tape barrier 16 that has a nominal thickness of 0.030 inches. Tape 16 is wrapped spirally along the longitudinal axis of the first thermoplastic layer 14. A second thermoplastic layer 18 has a nominal thickness of 0.062 inches and surrounds the tape 16.

The plurality of tubes 10 range in number from 2 through 19. The tubes 10 have an outer diameter of 0.315±0.003 inches and an inner diameter of 0.236±0.003 inches. The plurality of tubes 10 are composed of a flame-retardant polyethylene compound having a unique blend of linear low density polyethylene (LLDPE) and ethylene vinyl-acetate (EVA) resins containing hydrated alumina, antimony oxide and chlorinated paraffin. The compound has an excellent balance of flame retardancy and physical properties which account for its excellent processing characteristics. The nominal tube wall thickness corresponding to each tube 10 is equal to 0.040 inches.

Optical fiber cables (multiple fibers) 12 or other types of signalling devices may be present within each hollow tube 10.

The first thermoplastic layer 14 longitudinally surrounds the tube 10. In the preferred embodiment, the first thermoplastic layer 14 is a black flame-retardant polyvinyl chloride jacket having a nominal thickness of 0.062 inches. More particularly, the bundle inner jacket thickness of the first thermoplastic layer 14 is 0.062±0.010 inches. Additionally, the bundle outer jacket thickness of the first thermoplastic layer 14 is also 0.062±0.010 inches.

The tape 16, wrapped spirally along the longitudinal axis of the first thermoplastic layer 14, is preferably composed of fiberglass (nominal thickness 0.030 inches).

The second thermoplastic layer 18 is also a black flame-retardant polyvinyl chloride jacket having a nominal thickness of 0.062 inches. The second thermoplastic layer 18 completely surrounds the tape 16.

As shown in FIG. 1, the reference diameter of the bundle (i.e. the distance across the flats) is approximately 1.875 inches for the nineteen (19) tube bundle shown.

A process according to the present invention for insuring compliance with the UL 1666 fire test procedure for an optical fiber cable tubing bundle intended for vertical installation comprises the steps of liquefying a cross-sectional area of a thermoplastic layer 14 comprising the optical fiber cable tubing bundle; forcing the flow of the liquified thermoplastic inwardly to the center of the optical fiber cable tubing bundle; and, charring the liquified thermoplastic to form a cross-sectional area of solid material in the interior of the cable tubing bundle. The solid cross-sectional area of charred material acts as a fire stop, thus preventing vertical flow of the liquified thermoplastic down voids in the interior of the optical fiber cable tubing bundle.

In the step wherein the cross-sectional area of the thermoplastic layer comprising the vertically mounted optical fiber cable tubing bundle is liquified, a fire source is applied to one end of a vertically mounted cable tubing bundle. The fire source is a test flame producing approximately 527,500 Btu (thermochemical) per hour (154.5 KW). The fire source is applied to one end of the vertically mounted optical fiber cable tubing bundle for thirty (30) minutes, unless the non-metallic cable parts are completely consumed in a lesser amount of time. Upon application of the fire source, a cross-sectional area of the first thermoplastic layer 14 adjacent to the fire source liquifies.

In the step wherein the flow of the liquified layer is forced inwardly to the center of the optical fiber cable tubing bundle, the tape 16, wrapped spirally along the longitudinal axis of the first thermoplastic layer 14, restricts outward movement of the flow, thereby forcing movement inwardly to the center of the bundle.

Figure 2A:
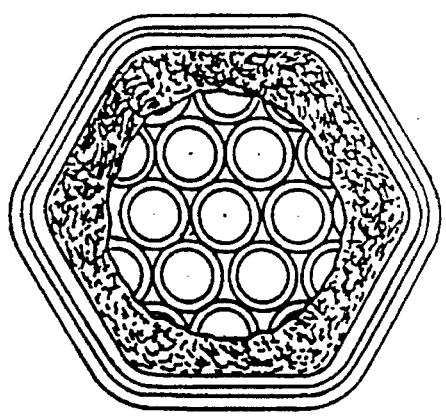
Figure 2B:
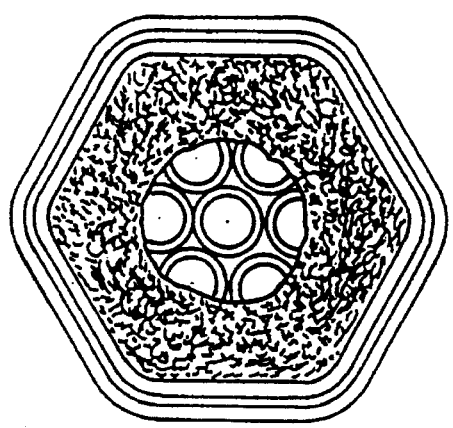
Figure 2C:
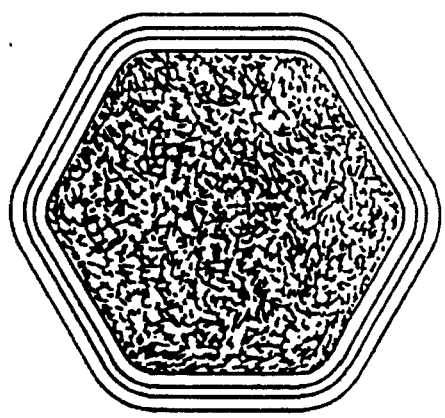

With reference to FIGS. 2A–2C, the liquified thermoplastic moves inwardly to fill the voids present in the interior of the optical fiber cable tubing bundle. The step of charring the liquified thermoplastic is effected by continuous application of the fire source. Over the applicable time period, a cross-sectional area of solid charred material is generated within the interior of the optical fiber cable tubing bundle. The cross-sectional area of solid charred material prevents vertical flow of liquified thermoplastic down the interior of the optical fiber cable tubing bundle. These FIGURES do not suggest, however, that 100% charring must be effected to insure the workability of the present invention.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. A flame-retardant optical fiber cable tubing bundle, which comprises:

(a) a plurality of tubes;

(b) a first thermoplastic layer surrounding the tubes; and, (c) a tape wrapped spirally along the longitudinal axis of the first thermoplastic layer.

2. A flame-retardant cable tubing bundle, which comprises:

(a) a plurality of hollow tubes having signalling devices present therein;

(b) a first layer surrounding the tubes, the first layer comprised of a flame-retardant compound; and, (c) a tape wrapped spirally along the longitudinal axis of the first layer.

3. The cable tubing bundle of claim 1, wherein the number of tubes ranges from 2–19.

4. The cable tubing bundle of claim 1, wherein the signalling devices are optical fiber cables.

5. The cable tubing bundle of claim 1, wherein the first layer is comprised of polyvinyl chloride.

6. The cable tubing bundle of claim 1, further comprising a second layer comprised of a flame-retardant compound, the second layer surrounding the tape.

7. The cable tubing bundle of claim 6, wherein the second layer is comprised of polyvinyl chloride.

8. The cable tubing bundle of claim 1, wherein the tape is comprised of glass fibers.

9. A method for forming a fire stop in a vertically mounted cable tubing bundle during a test procedure for determining a flame propagation height for the cable, which method comprises the steps of:

(a) liquefying a cross-sectional area of a thermoplastic layer comprising the cable tubing bundle by means of a fire source located at one end of the cable tubing bundle;

(b) forcing the liquified thermoplastic layer inwardly to the center of the cable tubing bundle;

(c) charring a portion of the liquified thermoplastic layer to form the fire stop in the interior of the cable tubing bundle, the fire stop preventing vertical flow of the remaining liquified thermoplastic layer.

10. A method as recited in claim 9, wherein the step of forcing the liquified thermoplastic layer inwardly includes spirally wrapping a tape along the longitudinal axis of the thermoplastic layer.

11. A flame-retardant cable tubing bundle, which comprises:

(a) a plurality of hollow tubes, the hollow tubes acting as a conduit for signalling devices;

(b) a first flame-retardant jacket surrounding said tubes; and, (c) a tape wrapped spirally along the longitudinal axis of the first flame-retardant jacket.

12. The cable tubing bundle of claim 11, wherein the first flame-retardant jacket is comprised of polyvinyl chloride.

13. The cable tubing bundle of claim 11, further comprising a second flame-retardant jacket, the second flame-retardant jacket surrounding the tape.

14. The cable tubing bundle of claim 13, wherein the second jacket is comprised of polyvinyl chloride.

* * * * *